US010967329B2

(12) United States Patent
Alano et al.

(10) Patent No.: US 10,967,329 B2
(45) Date of Patent: *Apr. 6, 2021

(54) AUTOMOTIVE EXHAUST AFTERTREATMENT SYSTEM HAVING A SWIRL-BACK MIXER

(71) Applicant: Faurecia Emissions Control Technologies, USA, LLC, Columbus, IN (US)

(72) Inventors: Eduardo Alano, Columbus, IN (US); Amaresh Rakkasagi, Bengaluru (IN); Laurent Poinsot, Montbeliard (FR)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,976

(22) Filed: Feb. 26, 2019

(65) Prior Publication Data
US 2020/0269189 A1    Aug. 27, 2020

(51) Int. Cl.
*B01D 53/94*    (2006.01)
*F01N 3/20*    (2006.01)
*F01N 3/28*    (2006.01)

(52) U.S. Cl.
CPC ..... *B01D 53/9431* (2013.01); *B01D 53/9477* (2013.01); *F01N 3/206* (2013.01); *F01N 3/2066* (2013.01); *F01N 3/2892* (2013.01); *F01N 2570/14* (2013.01)

(58) Field of Classification Search
CPC ............ B01D 53/9431; B01D 53/9477; F01N 3/2066; F01N 3/2892; F01N 3/206; F01N 2570/14
See application file for complete search history.

(56) References Cited

U.S. PATENT DOCUMENTS

| 8,915,064 | B2 | 12/2014 | Blaisdell |   |
|---|---|---|---|---|
| 10,030,564 | B2 | 7/2018 | Cossard |   |
| 2010/0101222 | A1* | 4/2010 | Oesterle | F01N 3/206 60/310 |
| 2010/0139258 | A1* | 6/2010 | Hackett | F01N 3/2066 60/299 |
| 2013/0216442 | A1* | 8/2013 | Brunel | B01F 5/0065 422/172 |
| 2016/0243510 | A1* | 8/2016 | Denton | B01D 53/9409 |

FOREIGN PATENT DOCUMENTS

| CN | 107559078 A | 1/2018 |
| CN | 206987928 U | 2/2018 |
| CN | 207892687 U | 9/2018 |
| EP | 3327263 A | 5/2018 |
| GB | 2539711 B | 12/2016 |
| JP | 2011099390 A | 5/2011 |
| WO | 2018075061 A1 | 4/2018 |

OTHER PUBLICATIONS

Eberspaecher starts series production of tunnel mixers, Mar. 19, 2018, 4 pages.

* cited by examiner

*Primary Examiner* — Brandon D Lee
(74) *Attorney, Agent, or Firm* — Barnes & Thornburg LLP

(57) ABSTRACT

An automotive exhaust aftertreatment system includes a reducing agent mixer. The reducing agent mixer includes a mixer body and doser that injects a reducing agent into the mixer body. The reducing agent mixer mixes an exhaust stream and the reducing agent prior to the exhaust stream being discharged from the reducing agent mixer.

11 Claims, 4 Drawing Sheets

AUTOMOTIVE EXHAUST AFTERTREATMENT SYSTEM HAVING A SWIRL-BACK MIXER

BACKGROUND

The present disclosure relates to exhaust aftertreatment systems for automotive applications, and particularly to a reducing agent mixer for injecting and mixing a reducing agent into the exhaust stream.

SUMMARY

A vehicle, in accordance with the present disclosure, includes a combustion engine and an exhaust aftertreatment system. The engine produces exhaust stream during operation and is coupled to the aftertreatment system via an exhaust passageway. The aftertreatment system is configured to inject a reducing agent, such as diesel emission fluid, into the exhaust stream. The reducing agent combines with the exhaust stream to cause a chemical reaction and reduce effluents, such as nitrous oxides (NOx), in the exhaust stream before it is released into the atmosphere.

In illustrative embodiments, the aftertreatment system includes a reducing agent mixer that is configured to improve mixing of the reducing agent into the exhaust stream, increase effluent removal efficiencies, and decrease reducing agent deposits on various components in the aftertreatment system. The reducing agent mixer includes a mixer body, a doser, and a reducing agent mixer sub-assembly. The mixer body defines a mixing chamber. The doser is configured to inject the reducing agent into the mixing chamber. The reducing agent mixer sub-assembly is located in the mixing chamber and is configured to induce mixing of the reducing agent and the exhaust stream.

The reducing agent mixer sub-assembly includes a swirl unit and a flow-back unit. The swirl unit defines a swirl chamber that induces a vortex of the exhaust stream directly adjacent to an injection point of the reducing agent. In illustrated embodiments, the swirl unit is configured to receive at least 50% of the exhaust stream moving through the reducing agent mixer. A mixture of the exhaust stream and the reducing agent is discharged from the swirl chamber toward the flow-back unit. The flow-back unit is configured to delay exit of the reducing agent from the mixer, to enhance mixing, and to increase the transformation rate of the reducing agent.

The flow back unit is configured to cause the mixture of the exhaust stream and the reducing agent discharged from the swirl chamber to turn 180 degrees twice before exiting the mixer. These turns increase the distance the mixture must travel before exiting the mixer to increase mixing. The flow back unit illustratively includes a flow-back baffle, a first lateral duct positioned on a first lateral side of the mixer body, and a second lateral duct positioned on a second lateral side of the mixer body. The flow-back baffle is shaped to cause the mixture to split into two halves and cause each half to make a 180 degree turn in opposite directions from one another. The first and second lateral ducts are positioned to receive a respective half of the mixture and are shaped to cause each half to make another 180 degree turn.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is perspective view of a diesel engine vehicle with an automotive exhaust aftertreatment system for reducing various effluents such as $NO_x$ (nitrous oxides) in the exhaust stream before releasing the engine exhaust into the atmosphere, the exhaust aftertreatment system including a reducing agent mixer configured to mix engine exhaust stream with a reducing agent to form a mixture that is then passed through a catalyst to chemically reduce effluents;

Figure 4:
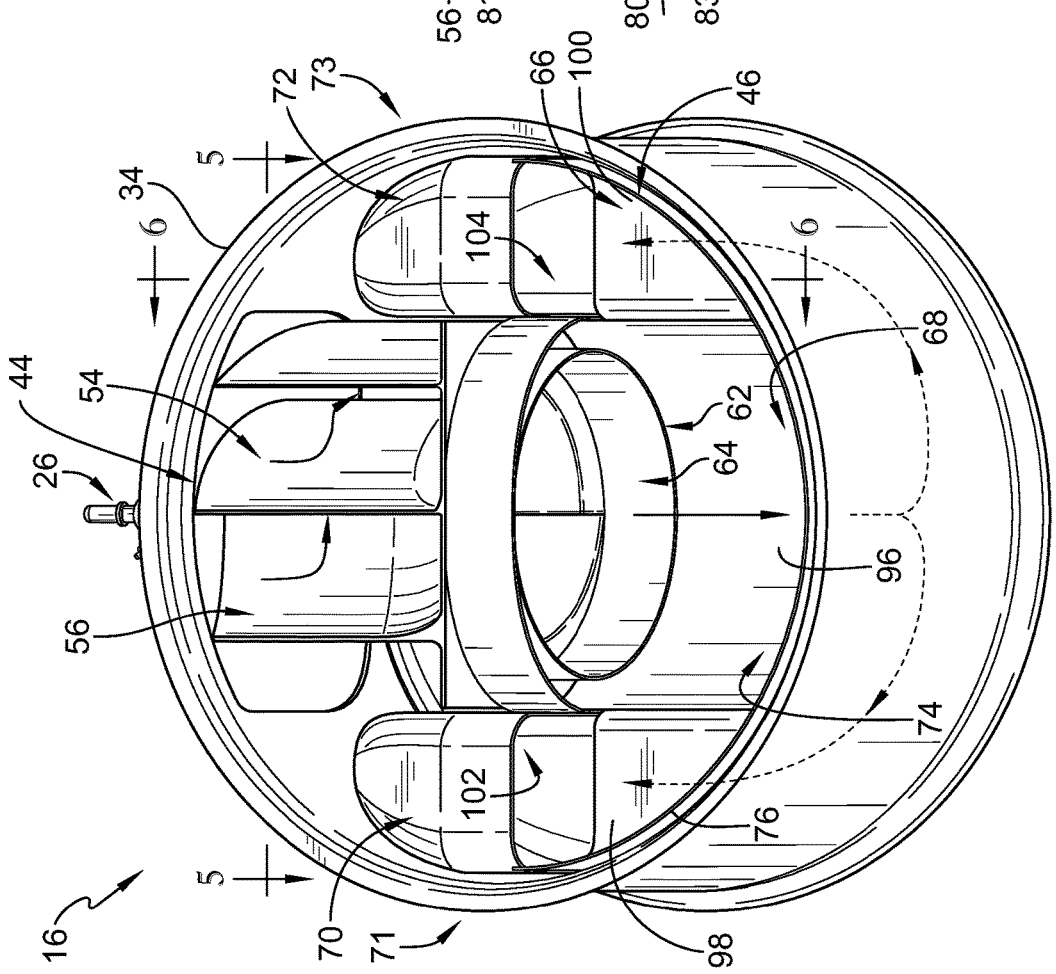
FIG. 4 is a perspective view of the reducing agent mixture with the upstream baffle removed, showing that the doser device is configured to inject the reducing agent into the swirl unit where the exhaust stream and the reducing agent are swirled together and then discharged into a upstream flow-back chamber defined by the upstream baffle and the flow-back baffle.
Figure 7:
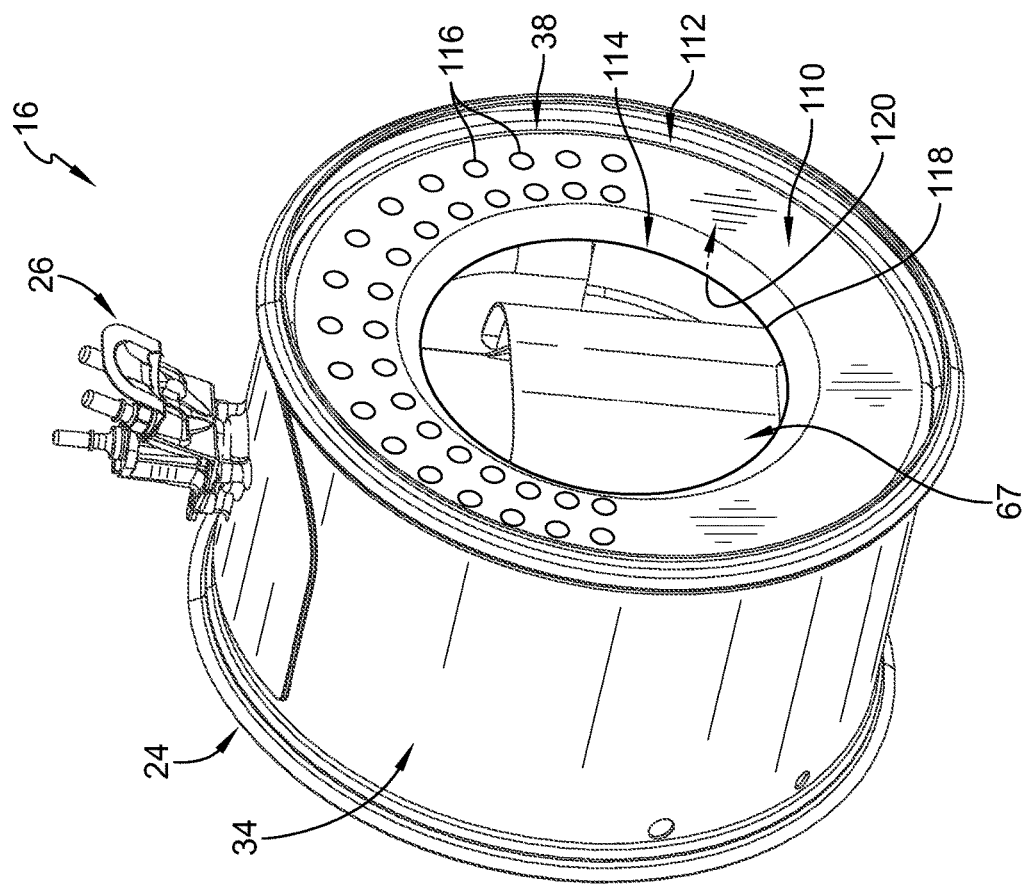
Figure 6:
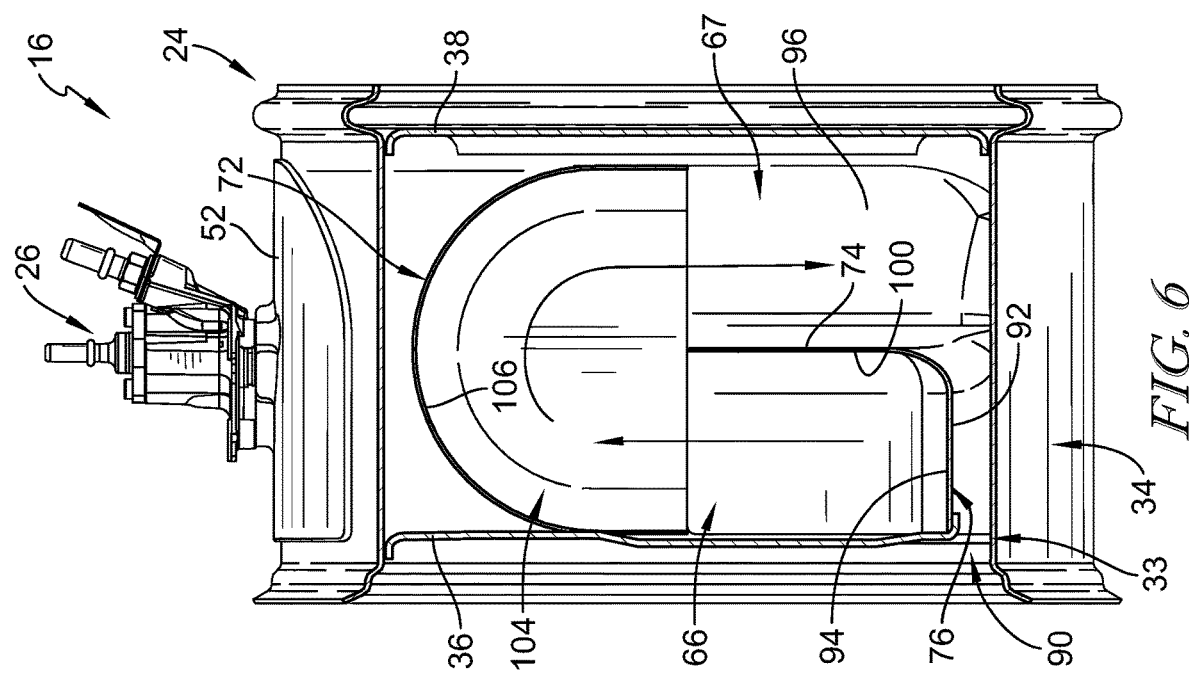

FIG. 6 is a sectional view of the reducing agent mixer taken along line 6-6 in FIG. 4 showing that a lateral duct defines a lateral duct passageway that extends from the upstream flow-back chamber to a downstream flow-back chamber defined between the flow-back baffle and the downstream baffle; and FIG. 7 is a perspective view of the reducing agent mixer showing that the downstream baffle is formed to include a central outlet spaced apart from the mixer body and a plurality of outlet holes extending circumferentially around at least a portion of the central outlet, the central outlet and the plurality of outlet holes are configured to conduct the mixture of the exhaust stream and the reducing agent downstream away from the reducing agent mixer.

DETAILED DESCRIPTION

For the purposes of promoting an understanding of the principles of the disclosure, reference will now be made to a number of illustrative embodiments illustrated in the drawings and specific language will be used to describe the same.

Figure 1:
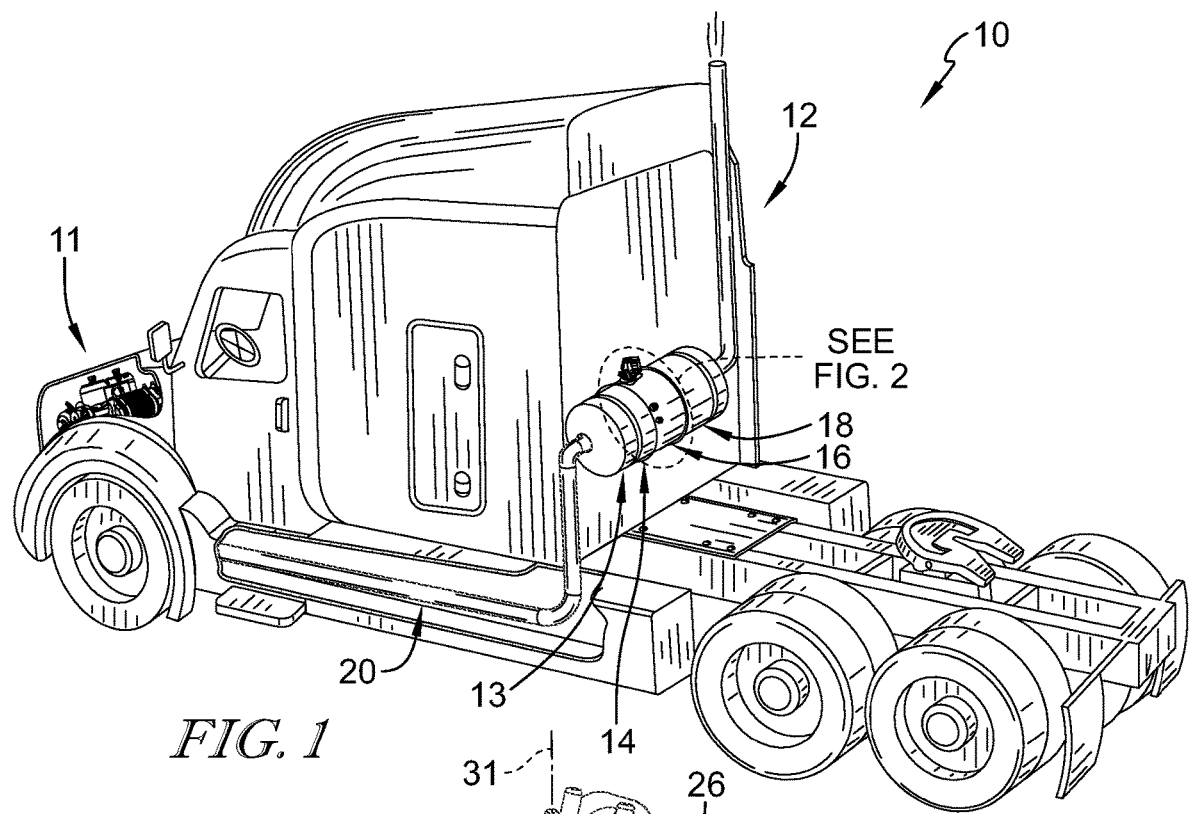

An illustrative diesel engine vehicle 10 configured for over the road transportation is shown in FIG. 1. The vehicle 10 includes a combustion engine 11 and an automotive exhaust aftertreatment system 12. The aftertreatment system 12 includes a diesel oxidation catalyst (DOC) 13, a diesel particulate filter (DPF) 14, a reducing agent mixer 16, and a selective catalytic reduction unit (SCR) 18. An exhaust passageway 20 is configured to direct an exhaust stream from the engine 11 to the exhaust aftertreatment system 12. Each of the DOC 13, the DPF 14, the reducing agent mixer 16, and the SCR 18 is configured to treat the exhaust stream and remove effluents from the exhaust stream before releasing the exhaust stream into the atmosphere.

Figure 2:
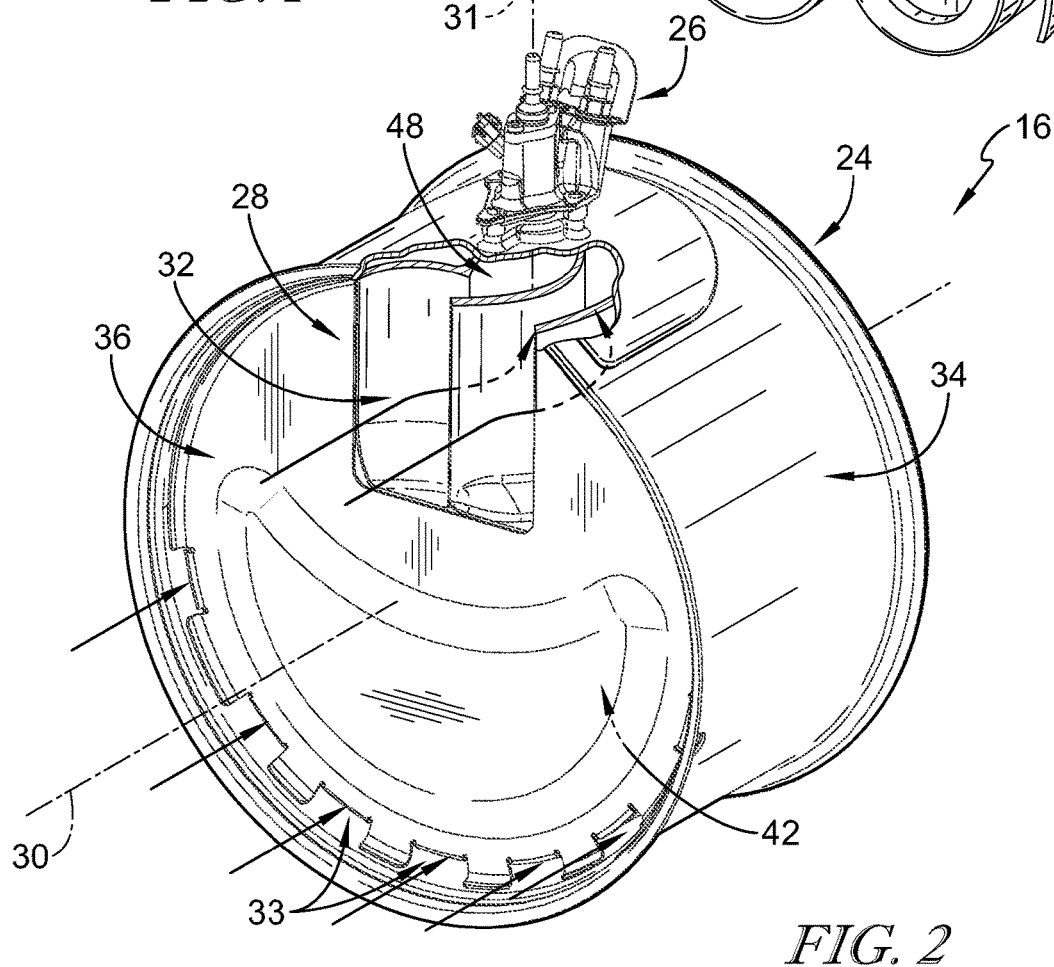
FIG. 2 is an enlarged perspective view of the reducing agent mixer with a portion cut away showing that the reducing agent delivery sub-assembly includes a swirl unit that is configured to induce a vortex of exhaust gas at the location where reducing agent is introduced into the exhaust gas stream.

In the illustrative embodiment, the reducing agent mixer 16 includes a mixer body 24, a doser 26, and a reducing agent delivery sub-assembly 28 as shown in FIG. 2. The mixer body 24 defines a portion of the engine exhaust gas passageway 20 and extends along a primary axis 30. The doser 26 is coupled to the mixer body 24 and is configured to discharge a reducing agent (DEF) into the engine exhaust gas passageway along a doser axis 31 that is perpendicular to the primary axis 30. The reducing agent delivery sub-assembly 28 is configured to mix the reducing agent with the exhaust stream to remove various effluents such as $NO_x$ (nitrous oxides) from the exhaust stream.

Figure 3:
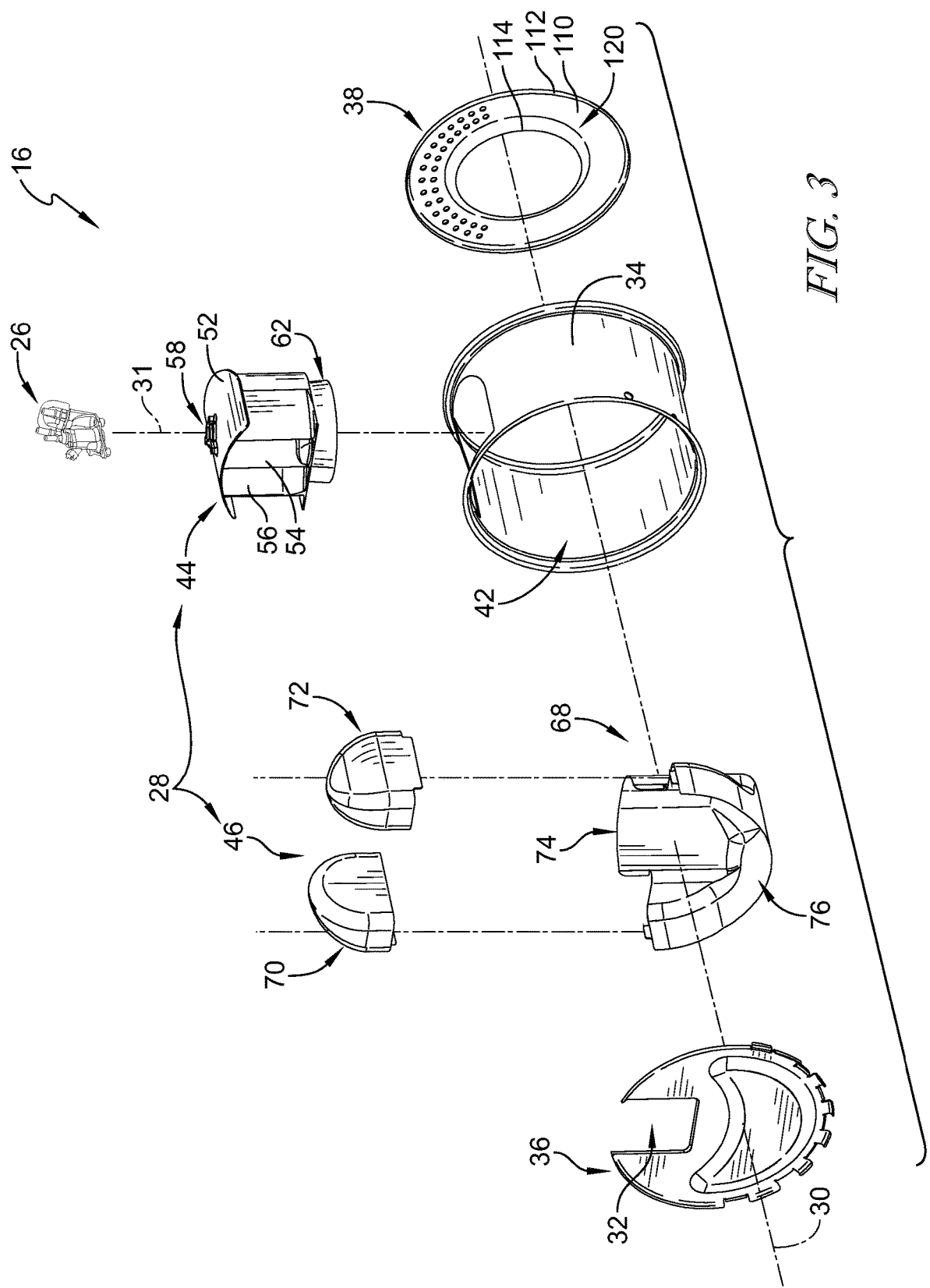
FIG. 3 is an exploded perspective view of the reducing agent mixer showing that the reducing agent mixer includes, from left to right, an upstream baffle, a flow-back unit having a flow-back baffle, a first lateral duct, and a second lateral duct, a mixer body, the swirl unit above the mixer body, a doser device above the swirl unit, and a downstream baffle.

The mixer body 24 includes a mixer can 34, an upstream baffle 36, and an optional downstream baffle 38 as shown in FIGS. 2 and 3. The mixer can 34 extends circumferentially around the primary axis 30. The upstream baffle 36 is arranged generally perpendicular to the primary axis and is configured to direct a majority of the exhaust stream into a primary exhaust-stream inlet 32 formed in the mixer 16. A minority of the exhaust stream is directed through bypass passages 33 also formed in the upstream baffle 36. The downstream baffle 38 is arranged generally perpendicular to the primary axis 30 and is configured to direct the exhaust stream from the mixer 16 to the SCR 18 after being the reducing agent is mixed with the exhaust stream in the mixer 16. The mixer can 34, the upstream baffle 36 and the downstream baffle 38 cooperate to define a mixing chamber 42 in which the reducing agent sub-assembly 28 is positioned to mix the exhaust stream with the reducing agent before the exhaust stream is discharged out of the mixer 16.

The reducing agent delivery sub-assembly 28 includes a swirl unit 44 and a flow-back unit 46 positioned in the mixing chamber 42 as shown in FIGS. 2 and 3. The swirl unit 44 defines a swirl chamber 48 that is configured to receive the reducing agent from the doser 26 along a doser axis 31. The swirl unit 44 is configured to receive at least 50% of the exhaust stream directly adjacent to an injection point of the reducing agent and to induce rotation, or a vortex, of the exhaust stream at the injection point to encourage mixing with the reducing agent. The flow-back unit 46 is configured to enhance mixing and increase a transformation rate of the reducing agent prior the mixture being sent to the SCR 18.

In use, at least 50% of the exhaust stream enters the primary exhaust stream inlet 32 and is guided by the swirl unit 44 to the injection point of the reducing agent as shown in FIGS. 2 and 4. In another embodiment, at least 80% of the exhaust stream enters the primary exhaust stream inlet 32 and is guided by the swirl unit 44 to the injection point. In yet another embodiment, at least 90% of the exhaust stream enters the primary exhaust stream inlet 32 and is guided by the swirl unit 44 to the injection point. The remaining portion of the exhaust stream enters the bypass passages 33 to transfer energy from the remaining portion of the exhaust stream to the flow-back unit 46 to decrease deposits of reducing agent thereon, as will be described in greater detail below. The doser 26 injects reducing agent at the injection point where the reducing agent is mixed into the exhaust stream by the vortex caused by the swirl unit 44.

An exhaust stream/reducing agent mixture is discharged from the swirl chamber 48 and into an upstream flow-back chamber 66 defined at least in part by the flow-back unit 46 as shown in FIG. 4. The mixture travels axially along the doser axis 31 until it is split and redirected by the flow-back unit 46 at the opposite side of the mixer 16 relative to the doser 26. In this way, the reducing agent travels a maximum distance from the injection point to the opposite side of the mixer 16 to delay impingement of the reducing agent on the mixer 16, enhance mixing, and increase the transformation rate of the reducing agent.

In particular, the flow-back unit 46 is configured to split and redirect the mixture to cause the mixture to make a 180 degree turn such that the mixture travels upwardly back toward the swirl unit 44 as shown in FIG. 4. The flow back unit 46 is then configured to redirect the mixture again to cause the mixture to flow out of the upstream flow-back chamber 66 and into a downstream flow-back chamber 67 as will be described in greater detail below. In the illustrative embodiment, the flow-back unit 46 causes the mixture to make another 180 degree turn as the mixture is moved from the upstream flow-back chamber 66 to the downstream flow-back chamber 67. In other embodiments, the flow-back unit 46 may cause the mixture to make a turn at a smaller angle, such as, for example, a 90 degree turn.

Figure 5:
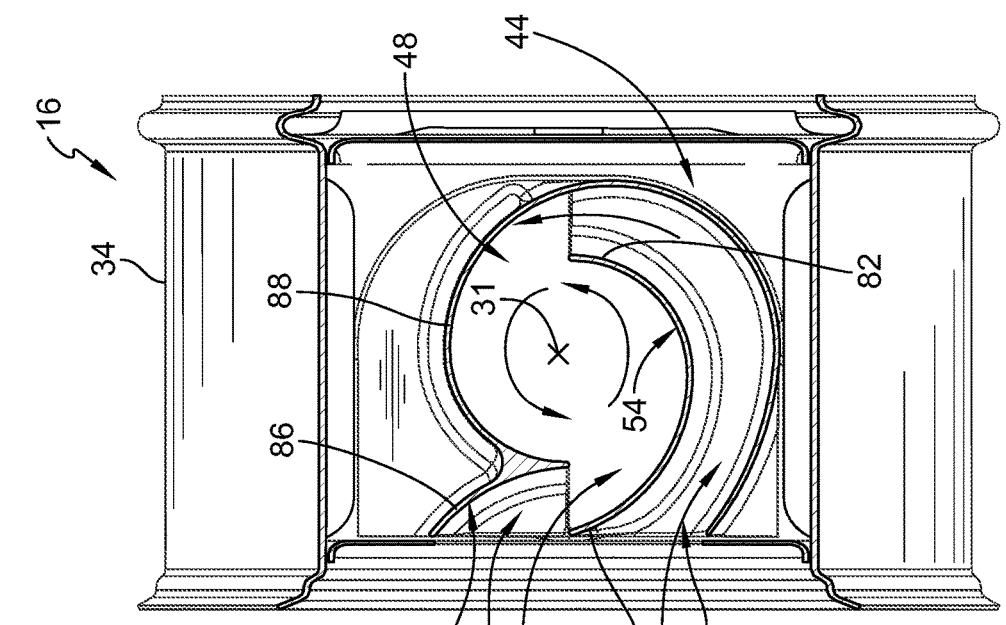
FIG. 5 is a sectional view of the reducing agent mixer taken along line 5-5 in FIG. 4 showing the first and second swirl fins directing the exhaust stream into the swirl chamber, and showing the first and second swirl fins shaped to induce a vortex in the swirl chamber to mix the exhaust stream and the reducing agent.

The swirl unit 44 includes a top wall 52, a first arcuate swirl fin 54, and a second arcuate swirl fin 56 as shown in FIGS. 3 and 5. The top wall 52 is formed to include a doser port 58 that is adapted to receive the doser 26 and provide the injection point of the reducing agent. The first and second swirl fins 54, 56 are coupled to the top wall 52 and extend axially away from the top wall 52 relative to the doser axis 31. The first and second arcuate swirl fins 54, 56 extend into the swirl chamber 48 and are shaped to induce the vortex in the swirl chamber 48 around the doser axis directly adjacent to the injection point of the reducing agent. An optional outlet ring 62 is coupled to the swirl unit 44 and defines a swirl chamber outlet 64 that is spaced apart axially from the top wall 52 relative to the doser axis 31. The vortex of mixture is discharged out of the swirl chamber 48 through the outlet 64 and into the upstream flow-back chamber 66.

The first swirl fin 54 includes a head end 80 and a tail end 82 arranged downstream of the head end 80 relative to the primary axis 30 as shown in FIG. 5. The head end 80 is positioned upstream and is configured to direct the exhaust stream into the swirl chamber 48 through the primary exhaust stream inlet 32. The tail end 82 is positioned in the swirl chamber 48. The first swirl fin 54 constantly changes slope as the swirl fin 54 extends into the swirl chamber 48 from the head end 80 to the tail end 82.

The second swirl fin 56 defines a radial boundary of the swirl chamber 48 and includes a fin arm 86 and a fin body 88 as shown in FIG. 5. The fin arm 86 cooperates with the first swirl fin 54 to direct the exhaust stream into the swirl chamber 48 through the primary exhaust stream inlet 32. The fin arm 86 is spaced apart from the head end 80 of the first swirl fin 54 to define a first swirl passageway 81 between the arm 86 and the head end 80. The fin body also cooperates with the first swirl fin 54 to direct the exhaust stream into the swirl chamber 48 through the primary exhaust stream inlet 32. The fin body 88 is spaced apart from the first swirl fin 54 opposite the arm 86 to define a second swirl passageway 83 between the first swirl fin 54 and the fin body 88.

The first swirl passageway 81 terminates upstream of the second swirl passageway 83 as shown in FIG. 5. The first swirl passageway 81 releases a portion of the exhaust stream into the swirl chamber 48 in a first direction. The second swirl passageway 83 wraps around the swirl chamber and releases another portion of the exhaust stream into the swirl chamber in a second direction that is generally opposite the first direction. The portions of the exhaust stream released from the first and second swirl passages 81, 83 complement one another to induce the vortex in the swirl chamber 48 in a counterclockwise direction. In this way, the swirl fins 54, 56 initially induce mixing of the exhaust stream and the reducing agent before the mixture is sent to the flow-back unit 46 for additional mixing.

The flow-back unit 46 includes a flow-back baffle 68, a first lateral duct 70, and a second lateral duct 72 as shown in FIGS. 4 and 6. The flow-back baffle 68 is arranged generally perpendicular to the primary axis 30 and cooperates with the upstream baffle 36 to define the upstream flow-back chamber 66 therebetween. The first lateral duct 70 is spaced apart radially from the primary axis 30 and the doser axis 32 along a first lateral side 71 of the mixer 16. The second lateral duct 72 is spaced apart radially from the primary axis 30 and the doser axis 32 along a second lateral side 73 of the mixer 16 that is opposite the first lateral side 71.

The flow-back baffle 68 includes a panel 74 and an end wall 76 coupled to the panel 74 as shown in FIGS. 4 and 6. The panel 74 extends from the swirl unit 44 to the end wall 76 parallel with the doser axis 31. The end wall 76 extends upstream from an end of the plate 74 relative to the primary axis 30 and extends circumferentially around the primary axis 30 from the first lateral duct 70 to the second lateral duct 72. The panel 74, the end wall 76 and the upstream baffle 36 cooperate to define the upstream flow-back chamber 66.

The end wall 76 is shaped to receive the mixture of the exhaust stream and the reducing agent from the swirl unit 44 and is configured to split and redirect the mixture toward the first and second lateral ducts 70, 72 as shown in FIGS. 4 and 6. The end wall 76 is configured to cause the mixture of the exhaust stream and the reducing agent to make a 180 degree turn such that it flows circumferentially around the primary axis 30 until the mixture is received and redirected again by the first and second lateral ducts 70, 72.

The end wall 76 is spaced apart radially inward from the mixer can 34 to provide a bypass gap 90 between the mixer can 34 and an outer surface 92 of the end wall 76 as shown in FIG. 6. The end wall 76 further includes an impingement surface 94 that faces radially inward toward the primary axis 30. The mixture of the exhaust stream and the reducing agent may contact the impingement surface 94 before the mixture is redirected by the end wall 76. The bypass passages 33 in the upstream baffle 36 open to permit a small amount of the exhaust stream to flow into the bypass gap 90. In this way, the small amount of the exhaust stream heats the end wall 76 to discourage reducing agent deposits from forming on the impingement surface 94 of the end wall 76.

In the illustrative embodiment, the panel 74 is contoured and includes a basin 96, a first plateau 98 and a second plateau 100 as shown in FIGS. 4 and 6. The basin 96 is generally aligned with the outlet ring 62 that defines the swirl chamber outlet 64. The first and second plateaus 98, 100 are positioned upstream from the basin 96 relative to the primary axis 30 and extend between the basin 98 and the end wall 76. The basin 96 and the first and second plateaus 98, 100 cooperate with the end wall 76 to redirect the mixture toward the first and second lateral ducts 70, 72.

In the illustrative embodiment, the first and second lateral ducts 70, 72 are mirror images of one another and are each shaped to define a lateral duct passageway 102, 104, respectively, as shown in FIGS. 4 and 6. The lateral duct passageways 102, 104 are configured to direct the mixture of the exhaust stream and the reducing agent from the upstream flow-back chamber 66 to the downstream flow-back chamber 67. The lateral ducts 70, 72 each have an inner u-shaped surface 106 defining a boundary of the passageways 102, 104. In the illustrative embodiment, the u-shaped surfaces 106 are configured to cause the mixture to make a 180 degree turn as the mixture is directed from the upstream flow-back chamber 66 to the downstream flow-back chamber 67. In this way, the first and second lateral ducts 70, 72 release the mixture into the downstream flow-back chamber 67 generally perpendicular to the primary axis 30.

The downstream flow-back chamber 67 is defined between the panel 74 of the flow-back unit 46 and the downstream baffle 38 as shown in FIGS. 6 and 7. The mixture is released from the lateral ducts 70, 72 toward the bypass gap 90 such that the small amount of the exhaust stream flowing through the bypass gap 90 is rejoined with the mixture in the downstream flow-back chamber 67. Once in the downstream flow-back chamber 67 the exhaust stream and the reducing agent are mixed further due to the direction of flows and the shape of the downstream baffle 38.

The downstream baffle 38 is shaped to enhance mixing and increase a transformation rate of the reducing agent prior the mixture being sent to the SCR 18. The downstream baffle 38 includes a ring 110, a radially outer rim 112, and a radially inner rim 114 as shown in FIG. 7. The ring 110 extends circumferentially around the primary axis 30. The radially outer rim 112 is shaped to interface with the mixer can 34. The radially inner rim 114 defines a central outlet 118. In other embodiments, a differently shaped downstream baffle may be used.

The ring 110 is formed to include a plurality of outlet holes 116 in at least a portion of the ring 110 as shown in FIGS. 3 and 7. In the illustrative embodiment, the holes 116 are formed in an upper half of the ring 110 and are positioned directly downstream of the lateral ducts 70, 72. The inner rim 112 and the outer rim 114 extend upstream from the ring 110 to define a recess 120 between the outer rim 112 and the inner rim 114. As the mixture exits the lateral ducts 70, 72, the mixture is directed through the recess 120 and circumferentially around the primary axis 30 to further mix the exhaust stream and the reducing agent. A fully-mixed mixture is released from the reducing agent mixer 16 through the central outlet 118 and the plurality of outlet holes 116 and is directed toward the SCR 18 for further treatment.

In illustrative embodiments, the entire diameter of the mixer 16 may be used to delay impingement therefore reducing liquid film on parts of the mixer 16. The mixer may be configured to send flow through lateral ducts 70, 72 to enhance mixing and increase DEF transformation rate to NH3. The mixer 16 may be configured to reduce backpressure in the aftertreatment system. The mixer may be configured to generate a swirling around the doser tip using more than 80% of exhaust flow across the mixer diameter and send back the mixture to each side of the mixer through the horse shoe ducts.

In illustrative embodiments, at least 50% of exhaust flow enters the main inlet opening 32. The exhaust flow may be collected in a manifold 44 and distributed through split openings 81, 83. The exhaust flow going through the split openings 81, 83 may generate a swirl around the doser injection point. The swirl center coincides to the doser axis 31. The exhaust flow and reducing agent may be mixed in the direction of the doser axis 31. The mixture may follow a long transformation path which is the diameter of the mixer and a small amount of the original spray may hit the opposite wall 76. Once the mixture reaches the opposite wall 76 the exhaust flow splits and is directed to enter in lateral ducts 70, 72 on each side of the mixer 16. The exhaust flow may be submitted to a 180 degree direction change in each lateral duct enhancing mixing and DEF transformation to NH3. The mixture may then be distributed to the inlet face of the SCR.

The following numbered clauses include embodiments that are contemplated and non-limiting:

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An exhaust aftertreatment system for use with a diesel engine, the system comprising
a mixer body defining an engine exhaust gas passageway that extends along a primary axis,
a doser configured to discharge reducing agent (DEF) into the engine exhaust gas passageway along a doser axis perpendicular to the primary axis, and
a reducing agent delivery sub-assembly, the sub-assembly including
a swirl unit arranged along a doser axis perpendicular to the primary axis of the mixer body, the swirl unit defining a swirl chamber configured receive the reducing agent from the doser and to induce rotation into an exhaust stream moving through the exhaust aftertreatment system to encourage mixing with the reducing agent and discharge a mixture of the exhaust stream and the reducing agent from the swirl chamber along the doser axis, and
a flow-back unit positioned downstream of the swirl unit and shaped to cause the mixture of the exhaust stream and the reducing agent discharged from the swirl chamber to make a first 180 degree turn such that the mixture travels circumferentially about the primary axis and toward the swirl unit and to make a second 180 degree turn in such that the mixture travels away from the swirl unit and perpendicularly to the primary axis.

2. The system of claim 1, wherein the swirl unit is formed to include a primary exhaust stream passageway that is configured to direct at least 50% of exhaust stream into the swirl chamber.

3. The system of claim 1, wherein the swirl unit includes a first arcuate swirl fin arranged in the swirl chamber to extend at least partially about the doser axis, and a second arcuate swirl fin arranged to extend at least partially about the doser axis, the second arcuate swirl fin offset radially from the first arcuate swirl fin relative to the primary axis to create split openings between the first arcuate swirl fin and the second arcuate swirl fin and to induce circumferential rotation of exhaust gas entering the swirl chamber about the doser axis.

4. The system of claim 1, wherein the flow-back unit includes a flow-back baffle shaped to receive the mixture, the flow-back baffle including a panel arranged generally perpendicular to the primary axis and an end wall arranged to extend upstream from the panel and shaped to cause the mixture discharged from the swirl chamber to make the first 180 degree turn.

5. The system of claim 4, wherein the mixer body is spaced apart from the primary axis a first radial distance and the end wall of the flow-back baffle is spaced apart from the primary axis a second radial distance that is less than the first radial distance to define a bypass gap between the end wall of the flow-back baffle and the mixer body.

6. The system of claim 5, wherein the sub-assembly further includes an upstream baffle formed to include a primary inlet aperture that is aligned with the swirl unit and a plurality of bypass apertures arranged opposite the primary inlet aperture and radially offset from the flow-back baffle to open into the bypass gap.

7. The system of claim 1, the subassembly further including a downstream baffle arranged perpendicular with the primary axis, the downstream baffle formed to include a central outlet defined by an inner rim and a plurality of secondary outlet holes formed in at least a portion of the downstream baffle.

8. An exhaust aftertreatment system for use with a diesel engine, the system comprising
a mixer body defining an engine exhaust gas passageway that extends along a primary axis,
a doser configured to discharge reducing agent (DEF) into the engine exhaust gas passageway along a doser axis perpendicular to the primary axis, and
a reducing agent delivery sub-assembly, the sub-assembly including
a swirl unit arranged along a doser axis perpendicular to the primary axis of the mixer body, the swirl unit defining a swirl chamber configured receive the reducing agent from the doser and to induce rotation into an exhaust stream moving through the exhaust aftertreatment system to encourage mixing with the reducing agent and discharge a mixture of the exhaust stream and the reducing agent from the swirl chamber along the doser axis, and
a flow-back unit positioned downstream of the swirl unit and shaped to cause the mixture of the exhaust stream and the reducing agent discharged from the swirl chamber to make a first 180 degree turn in a first direction and to make a second 180 degree turn in a second direction,
wherein the flow-back unit includes a flow-back baffle shaped to receive the mixture, the flow-back baffle including a panel arranged generally perpendicular to the primary axis and an end wall arranged to extend upstream from the panel and shaped to cause the mixture discharged from the swirl chamber to make the first 180 degree turn, and
wherein the flow-back unit further includes a first lateral duct positioned adjacent the swirl unit on a first lateral side of the mixer body and the doser axis, and a second lateral duct positioned adjacent the swirl unit on a second lateral side of the mixer body and the doser axis opposite the first lateral side.

9. The system of claim 8, wherein the first and second lateral ducts are configured to direct the mixture of the exhaust stream and the reducing agent from an upstream side of the panel to a downstream side of the panel.

10. The system of claim 8, wherein the first lateral duct is configured to receive a first half of the mixture of the exhaust stream and the reducing agent and the second lateral duct is configured to receive a second half of the mixture of the exhaust stream and the reducing agent, and the first and second lateral ducts are shaped to cause the first and second halves of the mixture to make the second 180 degree turn.

11. A vehicle configured for over the road transportation, the vehicle comprising
a combustion engine, and
an automotive exhaust aftertreatment system coupled to the combustion engine to receive an exhaust stream from the combustion engine, the automotive exhaust aftertreatment system including a mixer body defining an engine exhaust gas passageway that extends along a primary axis, a doser configured to discharge reducing agent (DEF) into the engine exhaust gas passageway along a doser axis perpendicular to the primary axis, and a reducing agent delivery sub-assembly, wherein the reducing agent sub-assembly includes a swirl unit arranged along a doser axis perpendicular to the primary axis of the mixer body and a flow-back unit positioned downstream of the swirl unit, wherein the swirl unit defines a swirl chamber configured receive the reducing agent from the doser and to induce rotation into the exhaust stream to encourage mixing with the reducing agent and discharge a mixture of the exhaust stream and the reducing agent from the swirl chamber along the doser axis, and wherein the flow-back unit is shaped to cause the mixture of the exhaust stream and the reducing agent discharged from the swirl chamber to make a first 180 degree turn such that the mixture travels circumferentially about the primary axis and toward the swirl unit and to make a second 180 degree turn such that the mixture travels away from the swirl unit and perpendicularly to the primary axis.

* * * * *